US007055733B2

(12) United States Patent
Weil et al.

(10) Patent No.: US 7,055,733 B2
(45) Date of Patent: Jun. 6, 2006

(54) OXIDATION CERAMIC TO METAL BRAZE SEALS FOR APPLICATIONS IN HIGH TEMPERATURE ELECTROCHEMICAL DEVICES AND METHOD OF MAKING (75) Inventors: K. Scott Weil, Richland, WA (US); John S. Hardy, Richland, WA (US); Jin Yong Kim, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/334,346

(22) Filed: Dec. 30, 2002

(65) Prior Publication Data
US 2003/0132270 A1 Jul. 17, 2003

Related U.S. Application Data (60) Provisional application No. 60/348,688, filed on Jan. 11, 2002.

(51) Int. Cl.
*B23K 31/12* (2006.01)
(52) U.S. Cl. .................................. 228/122.1; 228/248.1
(58) Field of Classification Search ............ 228/122.1, 228/123.1, 124.1, 124.5, 124.6, 245–262
See application file for complete search history.

(56) References Cited

U.S. PATENT DOCUMENTS

| 4,690,793 | A | * | 9/1987 | Okamura et al. ............ 376/136 |
| 4,871,108 | A | * | 10/1989 | Boecker et al. ............ 228/122.1 |
| 5,522,535 | A | * | 6/1996 | Ivanov et al. ............ 228/122.1 |
| 5,653,856 | A | * | 8/1997 | Ivanov et al. ........... 204/192.12 |
| 5,776,620 | A | * | 7/1998 | Josso et al. .................. 428/610 |
| 6,047,876 | A | * | 4/2000 | Smith ....................... 228/111.5 |
| 6,410,161 | B1 | * | 6/2002 | Li .............................. 428/621 |
| 6,547,286 | B1 | * | 4/2003 | White et al. ................ 285/354 |
| 2002/0155313 | A1 | * | 10/2002 | Palmgren .................... 428/621 |

FOREIGN PATENT DOCUMENTS

GB 2 156 257 10/1985

(Continued)

OTHER PUBLICATIONS

A. M. Meyer, P.R. Chidambaram, GR Edwards, A Comparison of the Wettability of copper-copper oxide and silver-copper oxide on polycrystalline alumina Journal of Materials Science, Oct. 1, 1995 vol. 30 No. 19, Chapmen & Hall LTD, Condon, p. 4781-4786.

(Continued)

*Primary Examiner*—Jonathan Johnson
(74) *Attorney, Agent, or Firm*—Douglas E. McKinley, Jr.

(57) ABSTRACT

A method of joining metal and ceramic parts, wherein an alumina forming metal part and a ceramic part are provided. A braze material in placed between the alumina forming metal part and the ceramic part, and the combination is then heated in an oxidizing atmosphere, preferably in air at a temperature of between 500° C. and 1300° C. The alumina forming metal parts are selected from the group consisting of high temperature stainless steels, such as Durafoil (alpha-4), Fecralloy, Alumina-coated 430 stainless steel and Crofer-22APU, and high temperature superalloys such as Haynes 214, Nicrofer 6025, and Ducraloy. The braze material is selected as a metal oxide-noble metal mixture, preferably Ag—CuO, Ag—$V_2O_5$, and Pt—$Nb_2O_5$, and more preferably between 30.65 to 100 mole % Ag in CuO.

20 Claims, 9 Drawing Sheets

FOREIGN PATENT DOCUMENTS

| | | | | |
|---|---|---|---|---|
| GB | 2 156 257 A | * | 10/1985 | |
| JP | 60 090875 A | | 5/1985 | |
| JP | 60090875 A | * | 5/1985 | |

OTHER PUBLICATIONS

Massaaki Naka and Ikuo Okamoto "Joining of Placa Carbon Steel to Alumnia with Copper Filler Metal" abstract Yosetgo Gakki Ronbonsho, Nov. 1985, vol. 3 No. 4, p. 702-707.

J. Löttgers, "Untersochungan zum direkten Lötea von Keramik-Metal-Uerbindungen in oxidierender Atmosphäre Oder interfem schutzgas" Schweisssen und Schneider, vol. 34, No. 3, 1982, pp. 145-149 table 3.

K.M. Erskine A.M. Meyer SM Pilgrim "Brazing Peruskite ceramics with silver/copper oxide braze alloys" Journal of Materials Sciences, 37, 2002, pp. 1705-1709.

C. Chr Schöler, A. Stuck, N. Beck, H. Keser, O Täck "Direct silver bonding—an alternative for substrates in power semiconductor packaging " Journal of Material Science 11, 2000, pp. 389-396.

* cited by examiner

OXIDATION CERAMIC TO METAL BRAZE SEALS FOR APPLICATIONS IN HIGH TEMPERATURE ELECTROCHEMICAL DEVICES AND METHOD OF MAKING

CROSS-REFERENCE TO RELATED APPLICATIONS

Priority is claimed to provisional U.S. patent application Ser. No. 60/348,688, entitled "Oxidation Ceramic-to-Metal Braze", filed Jan. 11, 2002 by Weil et al., the entire contents of which are hereby incorporated by this reference.

BACKGROUND OF THE INVENTION

To function properly, many high temperature electrochemical devices, such as ceramic-based fuel cells, oxygen generators, and chemical sensors, often require metal and ceramic components to be hermetically sealed each other. Unfortunately, the chemical and physical characteristics of many of the ceramic and metal components used in these devices have presented a variety of challenges for the development of effective seals. For example, one standard electrolyte material currently employed in nearly all of these devices is yttria stabilized zirconia (YSZ) because of its excellent oxygen ion transport properties, insulating electronic nature, and exceptional chemical stability under a wide variety of operating conditions and environments. However, to generate a sufficiently high rate of ionic transport, the device must be operated at high temperature, typically on the order of 650–900° C., and the thickness of the electrolyte membrane must be minimized; though generally no thinner than 5–10 μm, to mitigate the formation of through-thickness pinhole defects during manufacture. Since a solid state electrochemical device such as a fuel cell functions due to the oxygen ion gradient that develops across the electrolyte membrane, not only is hermiticity across the membrane important, but also that across the seal which joins the electrolyte to the body of the device. That is, the YSZ layer must be dense, must not contain interconnected porosity, and must be connected to the rest of the device with a high temperature, gas-tight seal. Typical conditions under which these devices are expected to operate and to which the accompanying YSZ-to-metal joints will be exposed include: 1) an average operating temperature of 750° C.; 2) continuous exposure to an oxidizing atmosphere on the cathode side; and 3) an anticipated device lifetime of 3000–30,000+ hours, as defined by the specific application. Depending on the function of the device, e.g. energy generation, the seal may also be exposed to a reducing environment on the anode side.

One approach to bonding metal with YSZ for operation in such environments, active metal brazing, utilizes a braze alloy that contains one or more reactive elements, often titanium, which will chemically reduce the ceramic faying surface and greatly improve its wetting behavior and adherence with the braze. However, there are at least two problems with using this type of joining material in fabricating solid-state electrochemical devices: 1) the complete oxidation of the active species in the braze during high temperature operation of the device will often lead to rapid deterioration of the joint at the ceramic/braze metal interface and an eventual loss in hermeticity and 2) exposure of the entire device to a reducing atmosphere at a temperature greater than ~800° C., typical processing conditions for active metal brazing, is often too demanding for many of the complex oxide materials used in these devices. When employed as electrochemically active electrodes, these mixed ionic/electronic conducting oxides tend to reduce during the joining operation and may irreversibly deteriorate via phase separation, which ultimately causes severe degradation in device performance. Thus, there exists a need for new methods of forming seals that overcome these difficulties and produce metal to ceramic seals which function satisfactorily in these demanding environments.

BRIEF SUMMARY OF THE INVENTION

Accordingly, it is an object of the present invention to provide an improved seal between a metal and a ceramic part resistant to oxidation at high temperatures.

It is a further object of the present invention to provide an improved seal between a metal and a ceramic part by first applying a braze material to an alumina forming metal part, contacting a ceramic part to said braze material, and heating the alumina forming metal part, braze material, and ceramic part in an oxidizing atmosphere.

It is a further object of the present invention to utilize a braze material selected as a metal oxide-noble metal mixture, including but not limited to Ag—CuO, Ag—$V_2O_5$, and Pt—$Nb_2O_5$.

It is a further object of the present invention to utilize a braze material selected as a mixture of between 30.65 to 100 mole % Ag in CuO to form an improved seal between a metal and a ceramic part.

It is a further object of the present invention to form an improved seal between a metal and a ceramic part by heating an alumina forming metal part, braze material, and ceramic part in air at a temperature of between 500° C. and 1300° C.

It is a further object of the present invention to form an improved seal between a metal and a ceramic part by first heating an alumina forming metal part at a temperature and for a time sufficient to form an aluminized surface of the alumina forming metal part, then heating a sandwich of the alumina forming metal part, braze material, and ceramic part in air at a temperature of between 500° C. and 1300° C.

These and other objects of the present invention are accomplished by providing a braze that will form a seal between a ceramic part and an oxide scale that grows on the metal part during joining under an oxidizing atmosphere. The goal of the present invention is therefore to reactively modify one or both oxide faying surfaces of the metal and alumina forming parts with a braze consisting of an oxide compound dissolved in a molten noble metal alloy such that the newly formed surface of the metal part is readily wetted by the remaining braze material. Preferably, the braze is selected as a metal oxide-noble metal mixture, including but not limited to Ag—CuO, Ag—$V_2O_5$, and Pt—$Nb_2O_5$. The method of the present invention can be expanded to provide a wider range of brazing temperatures for the braze material with the addition of braze temperature raising agents selected from the group consisting of Pd, Pt, and combinations thereof, and braze temperature lowering agents selected from the group consisting of $V_2O_5$, $MoO_3$. Braze temperature raising agents are preferably selected as between 10–70 mol % of said braze material. Braze temperature lowering agents are preferably selected as between 1–6 mol % of said braze material.

The selection of metal parts requires that the metal parts be oxidation resistant up to temperature of joining. Preferred metal parts include, but are not limited to, metal parts that will form alumina at the surface upon heating, such as high temperature stainless steels and high temperature superalloys, such as those described in U.S. patent application Ser. No. 10/260,630 entitled "GAS-TIGHT METAL/CERAMIC OR METAL/METAL SEALS FOR APPLICATIONS IN HIGH TEMPERATURE ELECTROCHEMICAL DEVICES AND METHOD OF MAKING" filed Sep. 27, 2002 now U.S. Pat. No. 6,843,406, the entire contents of which are incorporated herein by this reference. Preferred high temperature stainless steels include, but are not limited to, Durafoil (alpha-4), Fecralloy, Alumina-coated 430 stainless steel and Crofer-22APU. Preferred high temperature superalloys include, but are not limited to, Haynes 214, Nicrofer 6025, and Ducraloy.

DETAILED DESCRIPTION OF THE INVENTION

A series of experiments were conducted in accordance with the methods of the present invention thereby forming the joints, or seals, of the present invention. While these experiments are useful to demonstrate certain features and aspects of the present invention, they should in no way be interpreted as an exhaustive demonstration of all of the various aspects of the invention. As will be recognized by those having skill in the art, many of the advantages of the present invention can readily be achieved with significant variations from the experiments described herein, including, without limitation, the selection of the materials, and the methods and operating parameters used to combine those materials. Accordingly, the present invention should be broadly construed to include all such modifications and equivalents thereto that are encompassed by the appended claims.

A first set of experiments was conducted to demonstrate the operation and advantages of the present invention. 5% yttria stabilized zirconia (5YSZ) and thin gauge FeCrAlY (Fe, 22% Cr, 5% Al, 0.2% Y) were employed as the model ceramic electrolyte membrane/structural metal system in the brazing experiments. While 5YSZ was selected as an exemplary ceramic to provide proof of the utility of the present invention, it will be apparent to those having ordinary skill in the art that the methods and materials of the present invention would be expected to perform in a similar manner with other ceramics, and the selection of 5YSZ for these experiments should in no way be construed as limiting the applicability of the present invention to this particular example of a ceramic. Rather, all ceramics, including but not limited to yttria stabilized zirconia across the entire range of 3–8%; alumina, silicon carbide, and the mixed ionic/electronic conducting (MIEC) oxides described in the second set of experiments and described below should be included.

High density, 10 μm thick 5YSZ coupons measuring nominally 2 cm on a side were prepared using traditional tape casting and sintering techniques. Prior to their use in the braze experiments, the samples were cleaned with acetone and ethanol and dried at 300° C. for 1 hr. As-received 12 mil thick FeCrAlY sheet was sheared into 2 cm square pieces, polished lightly on both sides with 1200 grit SiC paper, and ultrasonically cleaned in acetone for 10 minutes. To form a stable aluminum oxide scale layer on the surfaces of each metal coupon, they were preoxidized at 1100° C. for 2 hrs in static ambient air prior to use. The average thickness of the scale grown in this manner was ~0.6 μm.

Braze pellets were fabricated by mixing copper (10 μm average particle diameter; Alfa Aesar) and silver (5.5 μm average particle diameter; Alfa Aesar) powders in the appropriate ratios to yield the target compositions given in Table 1. The copper powder was allowed to oxidize in-situ during heating in air to form CuO. Wetting experiments were conducted in a static air box furnace fitted with a quartz door through which the heated specimen could be observed. A high speed video camera equipped with a zoom lens was used to record the melting and wetting behavior of the braze pellet on a given substrate. The experiments were performed by heating the samples at 30° C./min to 900° C., where the temperature remained for fifteen minutes, followed by heating at 10° C./min to a series of set points and fifteen minute holds. In this way, the contact angle between the braze and substrate was allowed to stabilize for measurement at several different soak temperatures during one heating cycle: 900° C., 950° C., 1000° C., 1050° C., and 1100° C. Select frames from the videotape were converted to computer images, from which the wetting angle between the braze and substrate could be measured and correlated with the temperature log for the heating run. Microstructural analysis of the wetting specimens was performed on polished cross-sectioned samples using a JEOL JSM-5900LV scanning electron microscope (SEM) equipped with an Oxford windowless energy dispersive X-ray analysis (EDX) system.

TABLE 1

| Braze I.D. | Ag Content (in mole %) | CuO Content (in mole %) |
|---|---|---|
| Ag | 100 | 0 |
| Ag—1Cu | 99 | 1 |
| Ag—2Cu | 98 | 2 |
| Ag—4Cu | 96 | 4 |
| Ag—8Cu | 92 | 8 |

Figure 1:
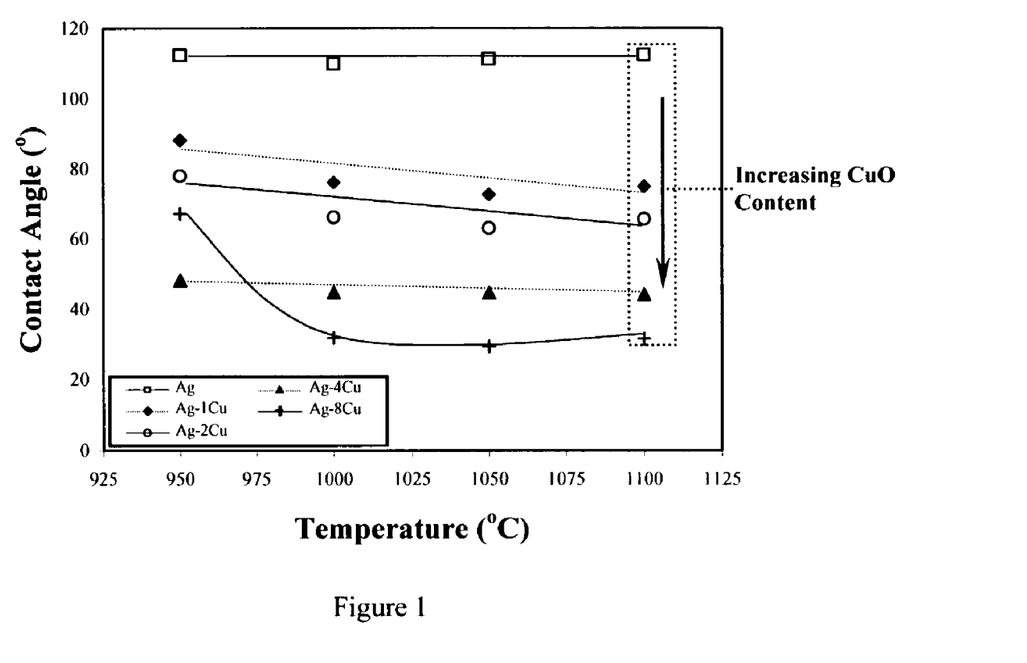
FIG. 1 is a graph showing the contact angle of Ag—CuO brazes on 5YSZ in air as a function of temperature in an experiment performed to demonstrate the present invention. Contact angle as a function of CuO content at 1100° C. is displayed within the inset box.
Figure 2:
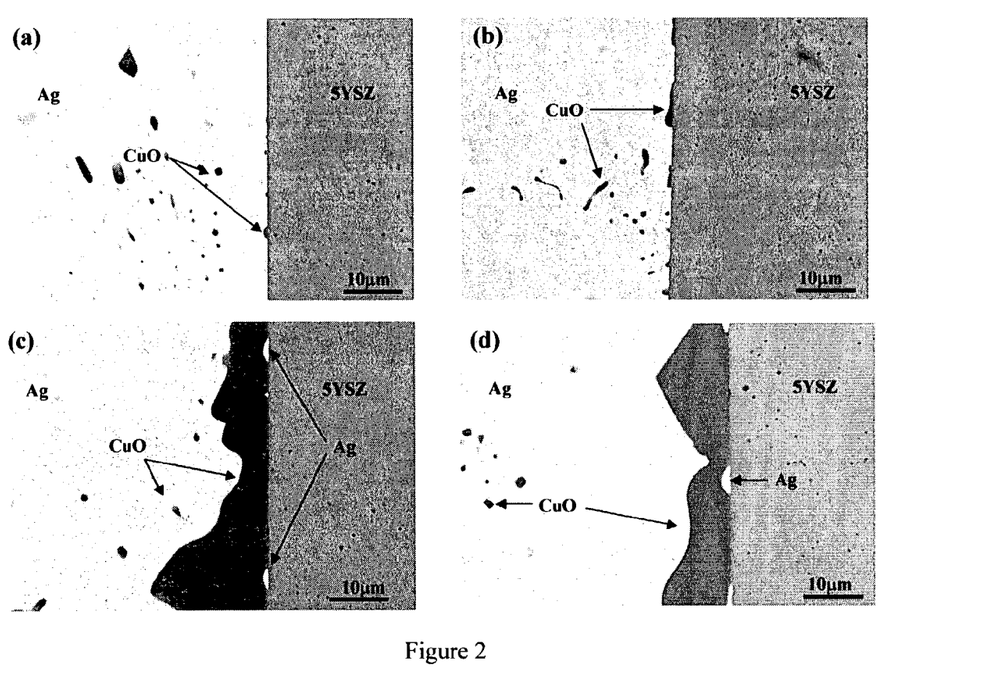
FIG. 2 is a series of SEM micrographs showing a cross section of braze/5YSZ interfaces created in an experiment performed to demonstrate the present invention: (a) Ag-1Cu, (b) Ag-2Cu, (c) Ag-4Cu, and (d) Ag-8Cu. Each wetting specimen was heated in air at a final soak temperature of 1100° C.
Figure 9:
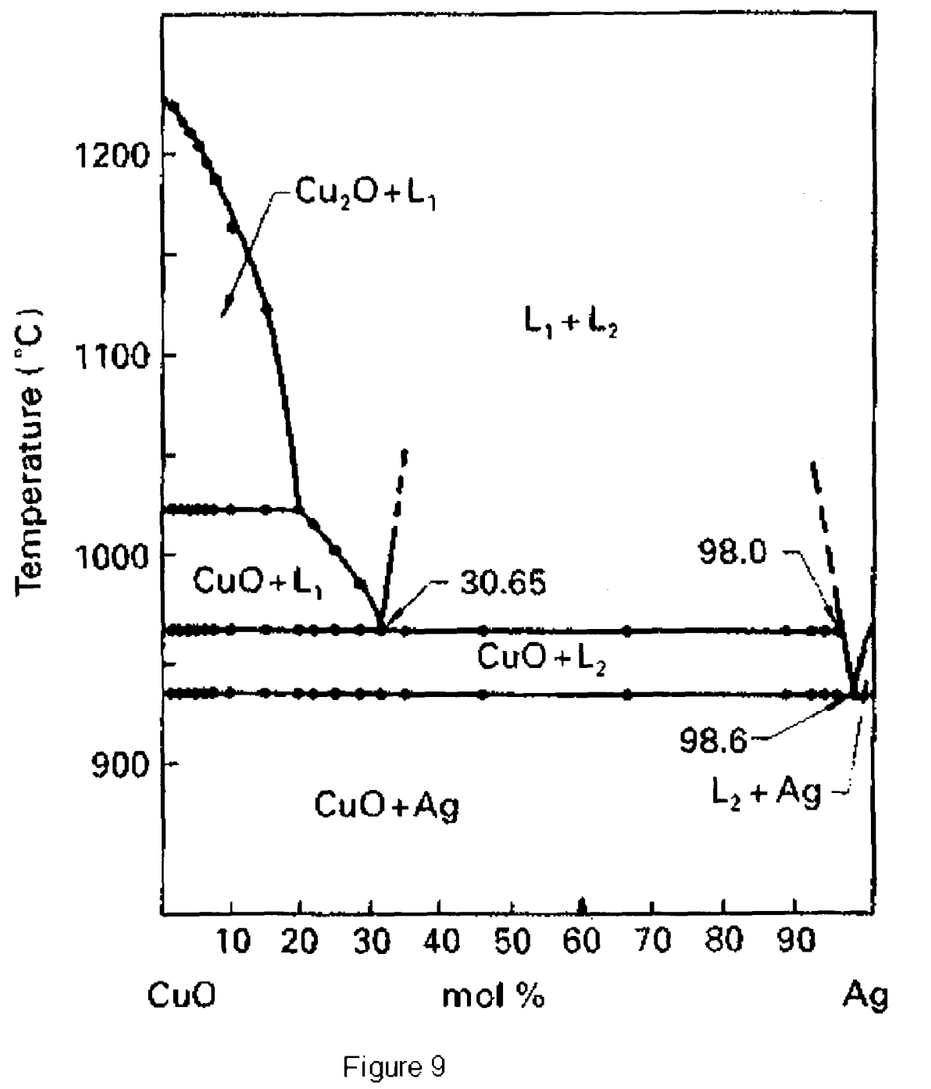
FIG. 9 is a Ag—CuO phase diagram reproduced from Shao, Z. B.; Liu, K. R.; Liu, L. Q.; Liu, H. K.; and Dou, S. 1993. Equilibrium phase diagrams in the systems PbO—Ag and CuO—Ag. *Journal of the American Ceramic Society* 76 (10): 2663–2664

Contact angle measurements of the molten Ag—CuO brazes on the 5YSZ membranes are shown as a function of temperature in FIG. 1. As predicted by a Ag—CuO phase diagram shown FIG. 9 reproduced from Shao, Z. B.; Liu, K. R.; Liu, L. Q.; Liu, H. K.; and Dou, S. 1993. Equilibrium phase diagrams in the systems PbO—Ag and CuO—Ag. *Journal of the American Ceramic Society* 76 (10): 2663–2664, the entire contents of which are incorporated herein by this reference, all of the brazes melt above 900° C. The fifteen minute hold time used in taking the sessile drop measurements appeared to be long enough for interfacial equilibrium to be established; in each case a stable contact angle was reached within five minutes. All of the brazes, except pure silver, display some degree of wetting with 5YSZ. From FIG. I it is apparent that for any of the given brazes, the contact angle with the 5YSZ surface remains essentially invariant with respect to temperature above 1000° C. However, as shown in the inset in FIG. 1, the extent of wetting improves dramatically as the ceramic content of the braze increases. Back scattered electron images of the four Ag—CuO braze compositions, as shown in FIGS. 2(a)–(d), suggest possible reasons for this trend.

Each specimen displayed in FIG. 2 was heat treated under the conditions described for the in-situ wetting experiments, i.e. through a series of intermediate soak temperatures, each for fifteen minutes, to a final temperature of 1100° C., then furnace cooled to room temperature. As expected, the majority phase in each braze is pure silver, as CuO is not soluble in silver at room temperature. Fine precipitates of CuO on the order of 1–5 μm in size are typically found in the silver matrix away from the interface with the 5YSZ. In the two brazes containing the lowest copper oxide content, discrete micron-size CuO particles are found along the braze/5YSZ interface. Found in the wide regions between these particles and in nearly perfect contact with the 5YSZ interface is pure silver. In the case of the high CuO content brazes, an interfacial layer of CuO nearly completely covers the 5YSZ substrate, occasionally disrupted by thin lens-shaped islands of silver.

The contact angle results from FIG. 1 suggest that the formation of a continuous layer of interfacial CuO improves the wetting of a Ag—CuO braze with 5YSZ. It is possible that the two different CuO morphologies observed in FIG. 2 are the direct result of the miscibility gap foung in a Ag—CuO phase diagram. At 1100° C. all four braze compositions will form a single phase liquid. However, according to the Ag—CuO phase diagram, as the Ag-4Cu and Ag-8Cu brazes are cooled, both systems will enter a miscibility gap in which two liquids form, a minority phase which is rich in CuO and a majority phase which is CuO-poor. Because the phases are immiscible, it is expected they will segregate, with the CuO-rich liquid preferentially migrating to and wetting the 5YSZ because of its higher oxide content and therefore lower expected interfacial energy with the oxide substrate. Upon further cooling to the monotectic temperature, 964° C., solid CuO will begin to precipitate from this liquid, nucleating at the interface with 5YSZ. As it does so, the concentration of silver in the silver-rich liquid increases. At the eutectic temperature, 932° C., solid CuO and Ag will simultaneously nucleate from the remaining liquid, presumably in a heterogeneous manner on the surface of the previously formed interfacial CuO layer. The high temperature Ag-1Cu and Ag-2Cu braze liquids, on the other hand, do not exhibit immiscibility and liquid phase separation upon cooling. As the temperature of these brazes is reduced below their respective liquidus, a small amount of proeutectic silver or CuO respectively precipitates out of solution, nucleating heterogeneously at the interface with 5YSZ. Upon further cooling to the eutectic temperature, solid Ag and CuO form simultaneously from the eutectic liquid.

Figure 3:
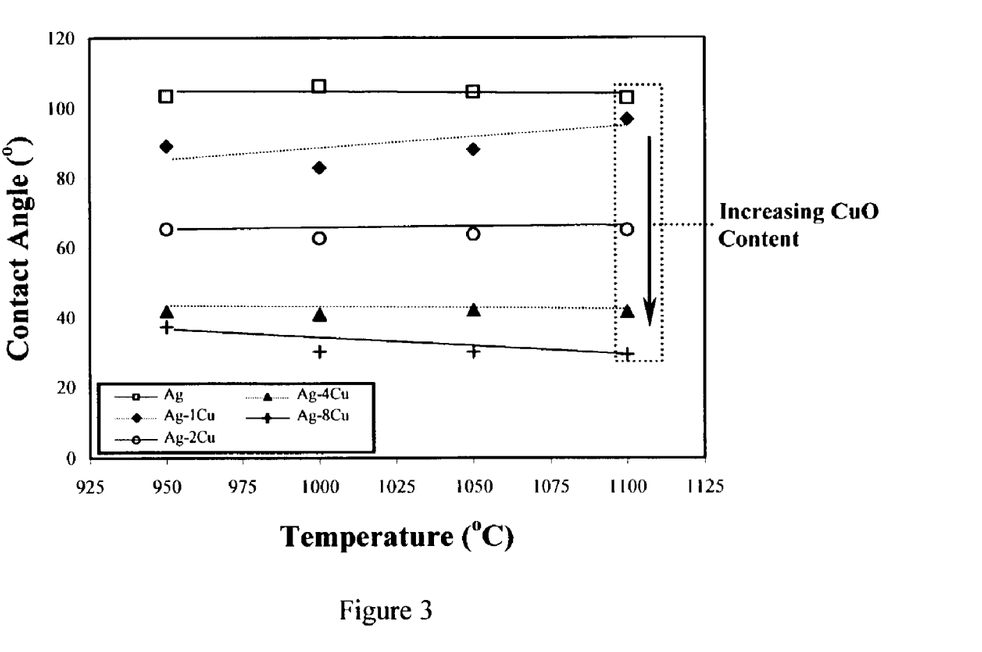
FIG. 3 is a graph showing the contact angle of Ag—CuO brazes on the scale surface of pre-oxidized fecralloy in air as a function of temperature in an experiment performed to demonstrate the present invention. Contact angle as a function of CuO content at 1100° C. is displayed within the inset box.
Figure 4:
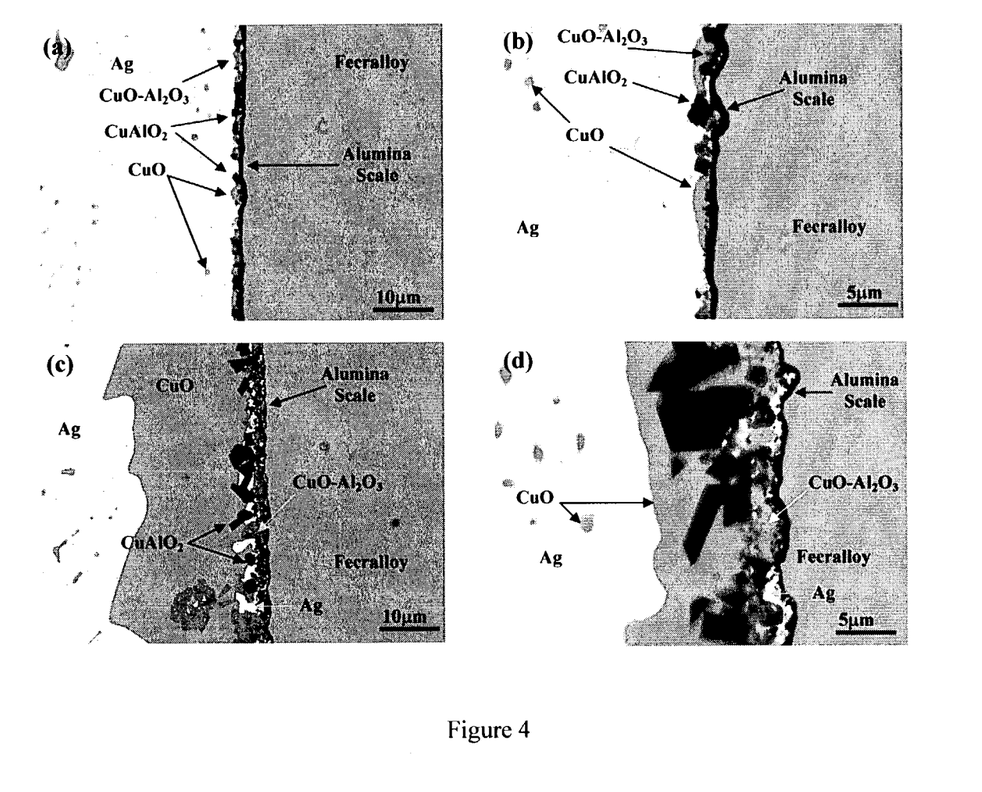
FIG. 4 is a series of SEM micrographs showing a cross section of braze/pre-oxidized fecralloy interfaces created in an experiment performed to demonstrate the present invention: (a) Ag-1Cu, (b) Ag-2Cu, (c) Ag-4Cu, and (d) Ag-8Cu. Each wetting specimen was heated in air at a final soak temperature of 1100° C.

The effects of braze composition and joining temperature on the contact angle between the Ag—CuO brazes and the oxide scale surface of the pre-oxidized fecralloy are shown in FIG. 3. The brazes appeared to melt in the same fashion as that observed in the 5YSZ experiments, quickly attaining a stable wetting angle in each case. Also similar to the 5YSZ experiments, the wetting behavior of the brazes on the oxide scale of the fecralloy was found to be essentially independent of temperature, but shows dramatic improvement with increasing CuO content.

Back scattered electron images of the four Ag—CuO braze compositions on the pre-oxidized fecralloy are shown in FIGS. 4(a)–(d). In each sample, a continuous ½–1 μm thick alumina scale was observed, which contained a small amount of iron and chromium, ~5 mol % and 3 mol % respectively. As found with the 5YSZ wetting specimens, far from the braze/scale interface the bulk braze contains micron-sized CuO particles in a matrix of essentially pure silver. However, along the braze/scale interface, an apparent alloying reaction between the CuO in the braze and $Al_2O_3$ in the scale takes place forming regions of mixed-oxide solid solution phase, $CuO$—$Al_2O_3$, contiguous to the metal scale. In the brazes with low CuO content, this reaction zone is thin and patchy, being interrupted by discrete islands of silver and CuO and occasional $CuAlO_2$ crystals, roughly 1–3 μm in diameter, which appear as a second product from the reaction between braze and scale. In the brazes that have higher CuO content, the oxide alloying zone is thicker, upwards of 7 μm thick, and more continuous, though still highly populated with silver and CuO particles and even larger crystallites of $CuAlO_2$. EDX results indicate that regardless of the braze composition, ~5–8 mol % each of iron and chromium is dissolved in the $CuO$—$Al_2O_3$ phase along the interface with the metal scale.

A second significant difference between the brazes in FIGS. 4(a)–(d) is the size and morphology of the CuO layer that contacts the interfacial alloying region and extends into the bulk of the braze. In the Ag-1Cu and Ag-2Cu brazes, this oxide layer is thin and discrete, being penetrated at numerous points by silver regions that directly contact the alloying zone. In the case of the Ag-4Cu and Ag-8Cu brazes, the CuO is much thicker, manifesting as an intermediary layer that completely covers the reaction zone and essentially occludes contact between the bulk silver and the interfacial region. The contact angle data for these brazes in FIG. 3 again bears out the wetting advantage that a continuous layer of CuO offers relative to the more discontinuous microstructure. As with the case of wetting on 5YSZ, it is assumed that the difference in morphology between the four binary brazes results in part because of the miscibility gap present in the Ag—CuO phase diagram that affects the microstructural development of the high CuO content brazes, but not the low ones.

A second set of experiments were conducted to further demonstrate the advantages and operation of the present invention with mixed ionic/electronic conducting (MIEC) oxides, including, but not limited to $SrFeCo_{0.5}O_x$, $BaCeO_3$, and $(La_{0.6}Sr_{0.4})(Co_{0.2}Fe_{0.8})O_3$. MIEC oxides are a class of ceramics that are of particular interest to the present invention as they contain ionic and electronic carriers in high enough concentration that both forms of charge conduction are exhibited at high level. Lanthanum strontium cobalt ferrite, $(La_{0.6}Sr_{0.4})(Co_{0.2}Fe_{0.8})O_3$ (LSCoF), was selected as an exemplary MIEC oxide to provide proof of the utility of the present invention, but as will be apparent to those having ordinary skill in the art, the methods and materials of the present invention would be expected to perform in a similar manner with other MIEC oxides, and the selection of lanthanum strontium cobalt ferrite for these experiments should in no way be construed as limiting the applicability of the present invention to this example of a MIEC oxide.

LSCoF pellets were fabricated by uniaxially compacting the oxide powder (99.9% purity; Praxair Specialty Ceramics, Inc.) in a carbon steel die under 7 ksi of pressure, followed by cold isostatic pressing at 20 ksi and sintering in air at 1250° C. for two hours. The final pellets measured approximately 1" in diameter by ⅛" thick, with an average density of 96% of theoretical. The pellets were then polished on one face to a 10 μm finish using successively finer grit diamond paste, cleaned with acetone and propanol, air dried, and heated in static air to 600° C. for four hours to burn off any residual organic contamination.

Braze pellets were fabricated by mixing copper (10 μm average particle diameter; Alfa Aesar) and silver (5.5 μm average particle diameter; Alfa Aesar) powders in the appropriate ratios to yield the target compositions given in Table 1. The copper powder was allowed to oxidize in-situ during heating in air to form CuO. Wetting experiments were conducted in a static air box furnace fitted with a quartz door through which the heated specimen could be observed. A high speed video camera equipped with a zoom lens was used to record the melting and wetting behavior of the braze pellet on the LSCoF substrate. The experiments were performed by heating the samples at 30° C./min to 900° C., where the temperature remained for fifteen minutes, followed by heating at 10° C./min to a series of set points and fifteen minute holds. In this way, the contact angle between the braze and substrate was allowed to stabilize for measurement at several different soak temperatures during one heating cycle: 900° C., 950° C., 1000° C., 1050° C., and 1100° C. Select frames from the videotape were converted to computer images, from which the wetting angle between the braze and substrate could be measured and correlated with the temperature log for the heating run.

Conductivity samples were prepared by joining two LSCoF pellets together in air at 1050° C. for ½ hr using a previously fabricated Ag—Cu braze foil. Again, the copper oxidizes in-situ to form CuO. 10° C./min heating and cooling rates were employed during brazing. The braze foil was synthesized by diffusion bonding copper and silver foils with the same areal dimension, but with the appropriate thicknesses required to achieve the target braze composition. Diffusion bonding was conducted in a Ar/4% $H_2$ cover gas at 720° C. for 10 hrs under a static load of ~½ psi after which the foil was rolled to a thickness of 0.07 mm. High temperature conductivity measurements of the junctions were made using a modified four point probe technique. Two contactors were fabricated by spot welding a pair of platinum leads to a piece of Pt foil that had the same areal dimensions as the LSCoF. The contactors were then bonded to the top and bottom of the LSCoF/braze/LSCoF sandwich using platinum paste. One lead each from the top and bottom contactors was connected to a HP 3263A DC power supply and the other two leads were connected to a HP 34401A multimeter and datalogger. The sample was heated in an air muffle furnace at 5° C./min to 750° C., where it was held for the duration of the test. 1.5A of continuous d.c. current were applied to the sample during testing and voltage measurements were recorded every two minutes. Microstructural analysis of the wetting and conductivity specimens was performed on polished cross-sectioned samples using a JEOL JSM-5900LV scanning electron microscope (SEM) equipped with an Oxford windowless energy dispersive X-ray analysis (EDX) system.

Figure 5:
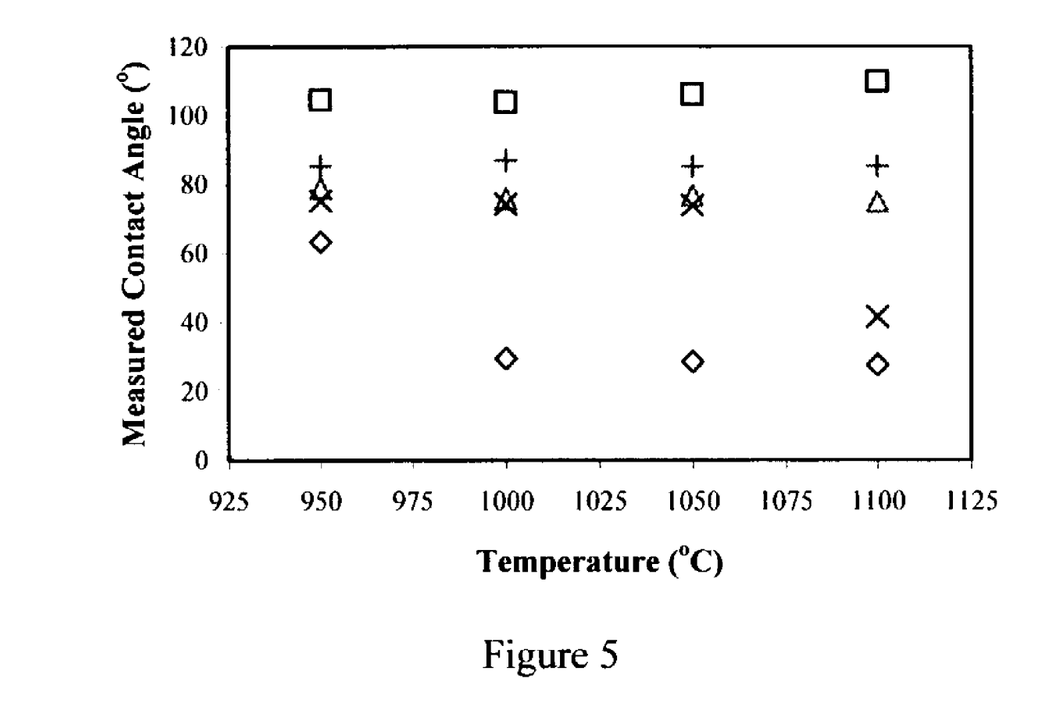
FIG. 5 is a graph showing the contact angle of Ag—CuO brazes on $(La_{0.6}Sr_{0.4})(CO_{0.2}Fe_{0.8})O_3$ in air as a function of temperature. The hold time at each s temperature was fifteen minutes.

Contact angle measurements of the molten Ag—CuO brazes on polished LSCoF are shown as a function of temperature in FIG. 5. As predicted by the Ag—CuO phase diagram, all of the brazes melt above 900° C. The fifteen minute hold time used in taking the sessile drop measurements appeared to be long enough for interfacial equilibrium to be established; in all cases a stable contact angle was attained within this period of time. With the exception of pure silver, all of the brazes displayed wetting with the LSCoF. As indicated in the figure, the wetting behavior of this series of brazes on LSCoF appears to be invariant of temperature, but quite sensitive to CuO content, improving dramatically with increasing amounts of the oxide.

Back scattered electron images of the four Ag—CuO wetting specimens, shown in FIGS. 6(a)–(d), suggest that this compositional dependence is related to the concentration and morphology of CuO along the braze/LSCoF interface. The bulk region of the braze in each sample consists of small ~1–5 µm diameter particles of CuO surrounded by a matrix of pure silver, which is not surprising considering the high silver content of the brazes and the fact that CuO is not soluble in silver at room temperature. Along the braze/LSCoF interface in each specimen, CuO appears to preferentially wet the substrate, forming a thin but distinct zone within the braze that exhibits one of two microstructural patterns. In the case of the two brazes that contain 2% CuO or less, the interface is decorated with discrete, ~1 µm half lens-shaped precipitates of CuO. The distance separating these precipitates appears to be greater in Ag-1Cu than in Ag-2Cu. In the higher CuO content specimens, a nearly continuous band of CuO is found in contact with the former LSCoF surface, occasionally disrupted by a small islands of pure silver. The oxide band is thickest in the Ag-8Cu specimen, which contains the highest CuO concentration of the five brazes investigated in this study. Note that in all of the samples in FIG. 6, evidence of Ag and CuO infiltration into the substrate can be observed, which occurs presumably via interconnected surface porosity.

Figure 6:
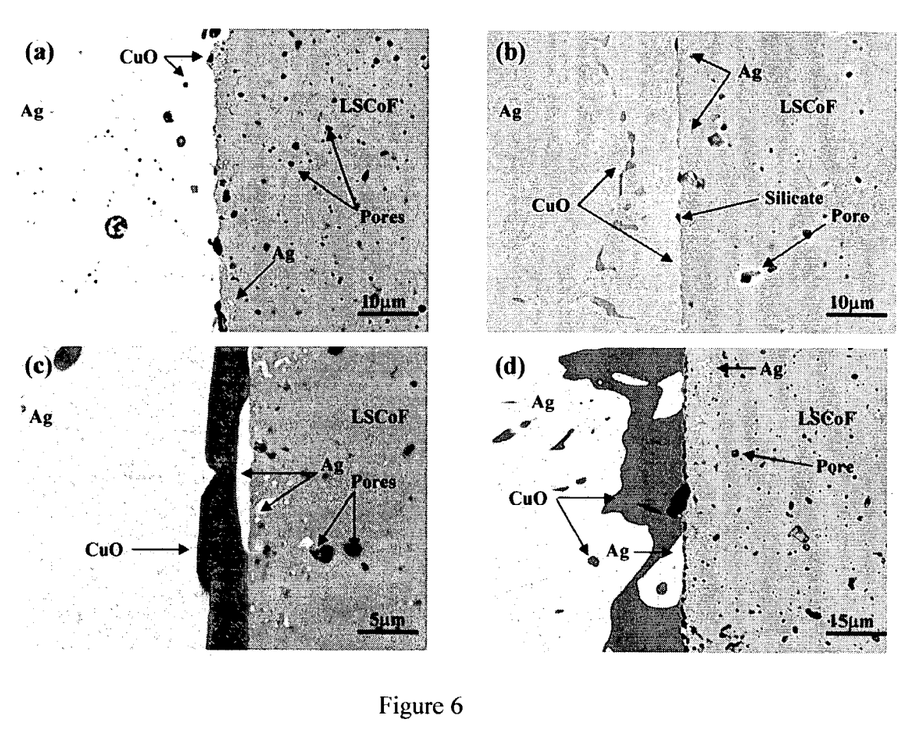
FIG. 6 is a series of SEM micrographs showing a cross section of braze/LSCoF interfaces: (a) Ag-1Cu, (b) Ag-2Cu, (c) Ag-4Cu, and (d) Ag-8Cu. Each wetting specimen was heated in air at a final soak temperature of 1100° C.

When correlated with the results of the wetting experiments, these micrographs indicate that a higher coverage of CuO on the LSCoF surface improves the wetting of the Ag—CuO braze. It is possible that the two different CuO morphologies observed in FIGS. 6(a)–(d) are the direct result of the miscibility gap in the Ag—CuO phase diagram. At 1100° C. all four braze compositions will form a single phase liquid. However, upon cooling, the Ag-4Cu and Ag-8Cu systems both enter a miscibility gap, forming silver-rich and CuO-rich liquid phases, whereas the liquid in the Ag-1Cu and Ag-2Cu brazes remain monophasic down to the eutectic temperature. Because the two liquid phases in the Ag-4Cu and Ag-8Cu brazes are immiscible, they will likely segregate, with the CuO-rich liquid preferentially migrating to and wetting the LSCoF because of its higher oxide content and therefore lower expected interfacial energy with the MIEC oxide substrate. Upon further cooling to the monotectic temperature, 964° C., CuO will begin to precipitate from this liquid, nucleating at the interface with LSCoF. As it does so, the concentration of silver in the silver-rich liquid increases. At the eutectic temperature, solid CuO and Ag will simultaneously nucleate from the remaining liquid. The Ag-1Cu and Ag-2Cu brazes, on the other hand, do not contain enough CuO to experience a montectic reaction and when cooled to just above the eutectic temperature will precipitate a small amount of proeutectic silver or CuO respectively out of solution, which is assumed to nucleate heterogeneously and decorate the interface with LSCoF. Upon cooling to the eutectic temperature, solid Ag and CuO form simultaneously from the eutectic liquid, again nucleating in heterogeneous fashion on the proeutectic silver and undecorated LSCoF surface, respectively.

Figure 7:
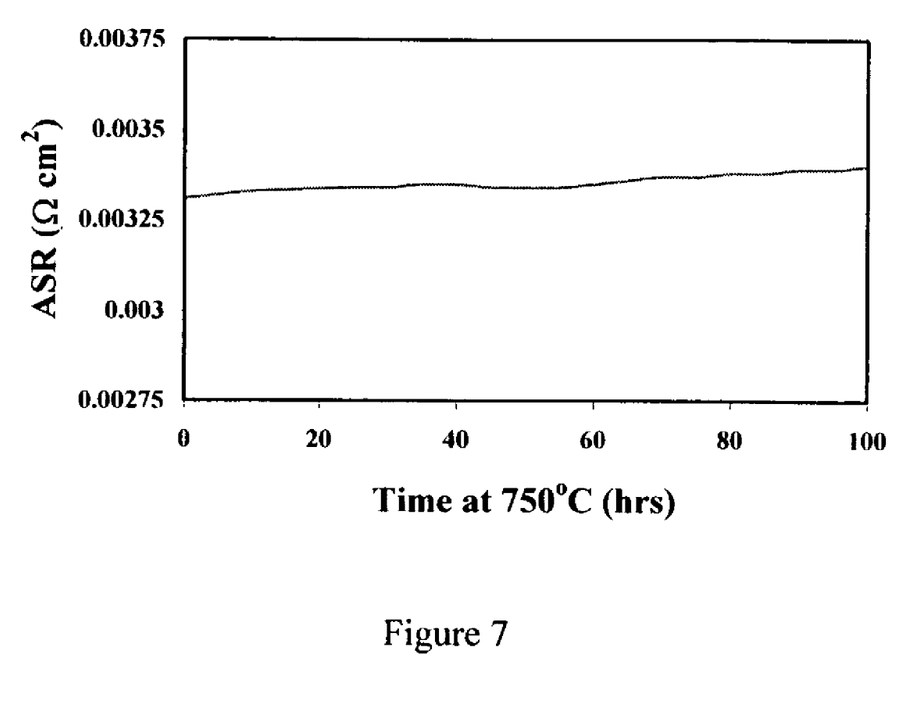
FIG. 7 is a graph showing the area specific resistance of a Junction between LSCoF and a Ag—CuO braze containing 4% CuO as a function of time in air at 750° C. and under 1.5A of d.c. current.
Figure 8:
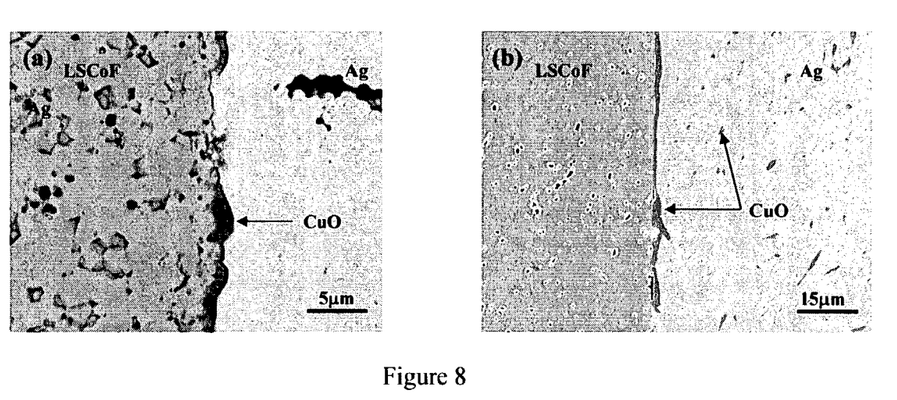
FIG. 8 is a series of SEM micrographs showing a cross section of Ag-4Cu/LSCoF interfaces tested in air at 750° C. for 100 hrs under: (a) 1.5 A of continuous d.c. current and (b) no current.

The Ag-4Cu braze was chosen as a convenient starting point for electrical testing because it displays a reasonable balance between wettability with LSCoF and silver content, and therefore expected conductance, at the braze/LSCoF interface. Plotted in FIG. 7 are area specific resistance (ASR) measurements of the Ag-4Cu/LSCoF junction as a function of time at 750° C. under 1.5A of continuous d.c. current and static ambient air. The. joint was tested at these conditions for 100 hrs. The values of ASR were determined by subtracting the temperature adjusted resistances of the LSCoF pellets from the raw data and dividing these corrected values by two to account for the presence of the two braze/LSCoF interfaces in the specimen. The sample displays a nearly steady ASR of 3.3 m$\Omega\cdot$cm$^2$ for the duration of the test. An acceptable limit of ASR for SOFC interconnect application is generally agreed to be ~40 m$\Omega$cm$^2$, which is over an order of magnitude higher that that observed in the brazed LSCoF junction. As seen in FIG. 8, metallographic examination of the electrically tested joint displayed no significant microtructural changes relative to a specimen heat treated at 750° C. for 100 hrs under no applied current.

CLOSURE

While a preferred embodiment of the present invention has been shown and described, it will be apparent to those skilled in the art that many changes and modifications may be made without departing from the invention in its broader aspects. For example, a wide range of metals, glasses, brazes and ceramics could be employed, together with a wide variety of methods for forming such materials into layers upon one and another. The appended claims are therefore intended to cover all such changes and modifications as fall within the true spirit and scope of the invention.

We claim:

1. A method of manufacturing metal-to-ceramic seals comprising the steps of:
   a) providing an alumina forming metal part selected from the group consisting of high temperature stainless steels and high temperature superalloys,
   b) providing a ceramic part,
   c) providing a braze material in between said alumina forming metal part and said ceramic part, said braze containing braze temperature modifying agents, wherein said braze temperature modifying agents are selected from braze temperature raising agents selected from the group consisting of Pd. Pt, and combinations thereof, and braze temperature lowering agents selected from the group consisting of $V_2O_5$, $MoO_3$, and combinations thereof, and
   d) heating said alumina forming metal part, braze material, and ceramic part in an oxidizing atmosphere.

2. The method of claim 1, wherein said high temperature stainless steels are selected from the group consisting of Durafoil (alpha-4), Fecralloy, Alumina-coated 430 stainless steel and Crofer-22 APU.

3. The method of claim 1, wherein said high temperature superalloys are selected from the group consisting of Haynes 214, Nicrofer 6025, and Ducraloy.

4. The method of claim 1, wherein said braze material is selected as a metal Oxide-noble metal mixture.

5. The method of claim 4 wherein said braze material is selected from the group consisting of Ag—CuO. Ag—$V_2O_5$, and Pt-$Nb_2O_5$.

6. The method of claim 1 wherein said braze temperature raising agents are selected as between 10–70 mol% of said braze material.

7. The method of claim 1 wherein said braze temperature lowering agents are selected as between 1–6 mol% of said braze material.

8. The method of claim 5 wherein said braze material is between 30.65 to 100 mole% Ag in CuO.

9. The method of claim 1, wherein the step of heating said alumina forming metal part, braze material, and ceramic part in an oxidizing atmosphere is performed in air at a temperature of between 500° C. and 1300° C.

10. A method of manufacturing metal-to-ceramic seals comprising the steps of:
   a) providing an alumina forming metal part,
   b) heating said alumina forming metal part at a temperature and for a time sufficient to form an aluminized surface of the alumina forming metal part,
   c) providing a ceramic part,
   d) providing a braze material in between said alumina forming metal part and said ceramic part, said braze material containing braze temperature modifying agents wherein said braze temperature modifying agents are selected from braze temperature raising agents selected from the group consisting of Pd, Pt, and combinations thereof, and braze temperature lowering agents selected from the group consisting of $V_2O_5$, $MoO_3$, and combinations thereof and
   e) heating said alumina forming metal part, braze material, and ceramic part in an oxidizing atmosphere.

11. The method of claim 10 wherein said alumina forming metal part is selected from the group consisting of high temperature stainless steels and high temperature superalloys.

12. The method of claim 11 wherein said high temperature stainless steels are selected from the group consisting of Durafoil (alpha-4), Fecralloy, Alumina-coated 430 stainless steel and Crofer-22APU.

13. The method of claim 11 wherein said high temperature superalloys are selected from the group consisting of Haynes 214, Nicrofer 6025, and Ducraloy.

14. The method of claim 10 wherein said braze material is selected as a metal oxidenoble metal mixture.

15. The method of claim 14 wherein said braze material is selected from the group consisting of Ag—CuO, Ag—$V_2O_5$, and Pt—$Nb_2O_3$.

16. The method of claim 15 wherein said braze material is between 30.65 to 100 mole% Ag in CuO.

17. The method of claim 10 wherein said braze temperature raising agents are selected as between 10–70 mol% of said braze material.

18. The method of claim 10 wherein said braze temperature lowering agents are selected as between 1–6 mol% of said braze material.

19. The method of claim 10 wherein said braze material is between 30.65 to 100 mole% Ag in CuO.

20. The method of claim 10 wherein the step of heating said alumina forming metal part, braze material, and ceramic part in an oxidizing atmosphere is performing in air at a temperature of between 500° C. and 1300° C.

* * * * *